United States Patent
Munenaga et al.

(10) Patent No.: US 7,669,916 B2
(45) Date of Patent: Mar. 2, 2010

(54) REAR PART STRUCTURE OF VEHICLE

(75) Inventors: Kenichi Munenaga, Saitama (JP); Fumiyoshi Mizutani, Saitama (JP)

(73) Assignee: Honda Motor Co., Ltd., Tokyo (JP)

(*) Notice: Subject to any disclaimer, the term of this patent is extended or adjusted under 35 U.S.C. 154(b) by 137 days.

(21) Appl. No.: 12/005,044

(22) Filed: Dec. 21, 2007

(65) Prior Publication Data

US 2008/0148518 A1 Jun. 26, 2008

(30) Foreign Application Priority Data

Dec. 25, 2006 (JP) ............................... 2006-348454

(51) Int. Cl.
*B60J 5/02* (2006.01)
(52) U.S. Cl. .............................. 296/146.8; 296/146.11
(58) Field of Classification Search ................. 296/0.8, 296/146.11, 146.123, 14.8, 146.126; 16/334
See application file for complete search history.

(56) References Cited

U.S. PATENT DOCUMENTS 4,620,743 A * 11/1986 Eke ......................... 296/146.8
7,021,698 B2 4/2006 Yamada et al.
2005/0046229 A1* 3/2005 Yamada et al. ........... 296/146.8

FOREIGN PATENT DOCUMENTS

| FR | 2815992 | 5/2002 |
| JP | 2005-075195 | 3/2005 |
| JP | 2005-075210 | 3/2005 |

* cited by examiner

*Primary Examiner*—Lori L Lyjak
(74) *Attorney, Agent, or Firm*—Carrier, Blackman & Associates P.C.; William D. Blackman; Joseph P. Carrier (57) ABSTRACT

A rear door is supported at a rear end of a vehicle by a hinge assembly, which includes a hinge base part and a door hinge part. The hinge base part is provided in a groove formed at a joint between a roof panel and a side panel of a vehicle body, and the door hinge part is attached to the rear door and swingably supported by the hinge base part. The hinge base part includes an anchor portion fixed to a bottom of the groove, a swing motion support portion disposed in a position aligned in a longitudinal direction of the vehicle with the anchor portion and separate from the anchor portion to support the door hinge part, and a connecting portion extending between the anchor portion and the swing motion support portion to fix the swing motion support portion relative to the anchor portion.

13 Claims, 6 Drawing Sheets

REAR PART STRUCTURE OF VEHICLE

CROSS-REFERENCE TO RELATED APPLICATION(S)

This application claims the foreign priority benefit under Title 35, United States Code, §119 (a)-(d), of Japanese Patent Application No. 2006-348454, filed on Nov. 25, 2007 in the Japan Patent Office, the disclosure of which is herein incorporated by reference in its entirety.

BACKGROUND OF THE INVENTION

This invention relates to a rear part structure of a vehicle, for hinging a rear door to a groove that is formed at a joint between a roof panel and a side panel of a vehicle body.

Recreational vehicles or RVs, such as minivans and station wagons, usually have a hatchback-type rear door with a hinge structure allowing the rear door to open upwards in order to facilitate loading into the rear deck of the vehicle. A rear part structure of a vehicle in which a hinge for use in joining a rear door to a vehicle body is provided at a so-called mohican groove so as to ensure that the door frame may be designed to provide a door opening of an increased vertical dimension is known in the art; for example, see U.S. Pat. No. 7,021,698 B2, the content of which is herein incorporated by reference in its entirety.

Figure 6:
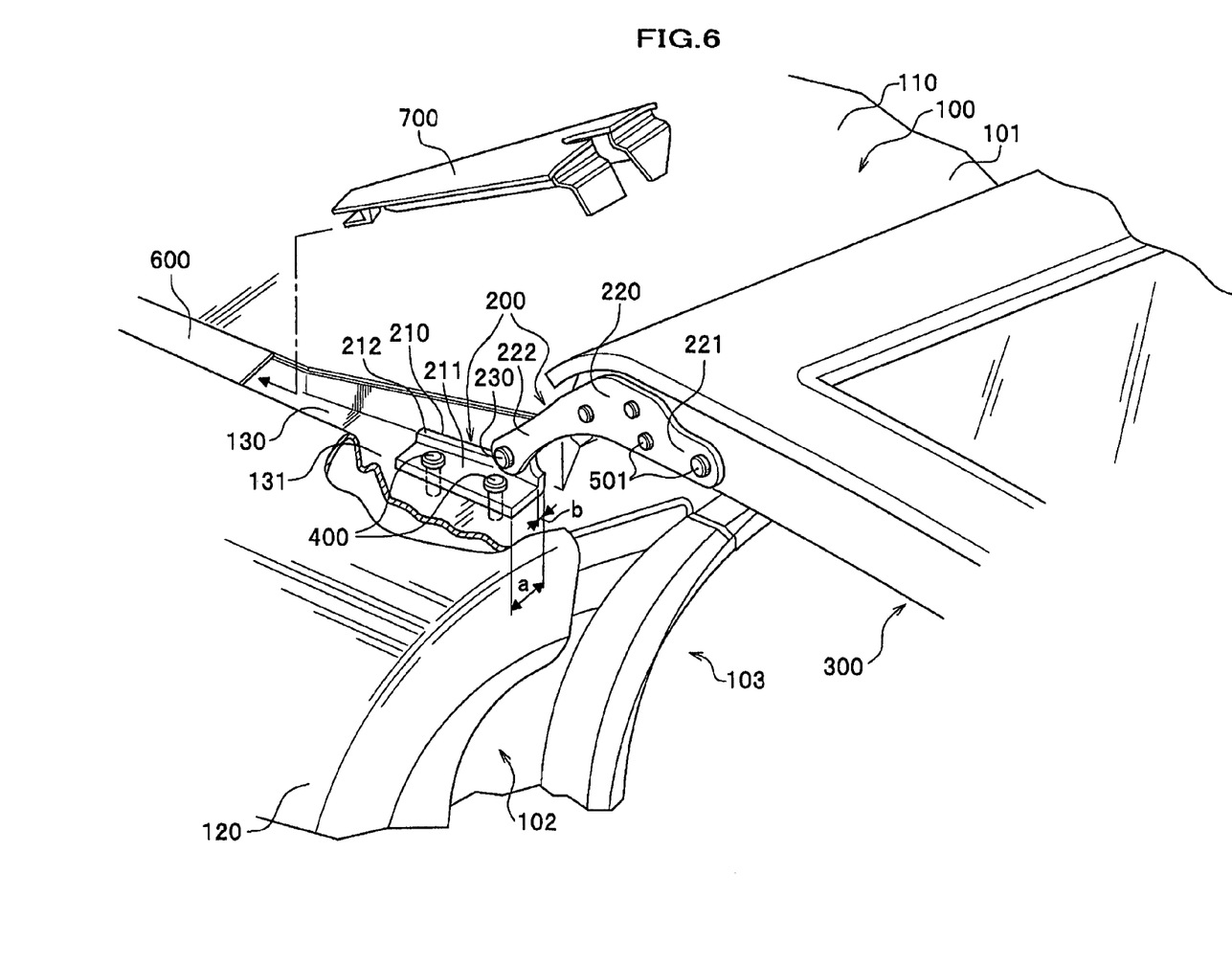
FIG. 6 is magnified and exploded perspective view of a principal portion of a rear part of a vehicle with a rear door lifted open, for illustrating a conventional rear part structure of a vehicle.

Such a rear part structure of a vehicle is shown in FIG. 6 in which a principal portion thereof with a rear door lifted open is illustrated in perspective.

As shown in FIG. 6, a groove 130 which is rectangular in cross section and formed at a joint between a roof panel 110 and a side panel 120 of a vehicle body 100 is located in a roof portion 101 of the vehicle body 100 (in an upper exterior surface of the vehicle) and thus called "mohican groove", which may be embodied for example by providing a side panel 120 made in a shape curved in an inward direction of the vehicle toward its top end so that an upper area of an outer surface of the side panel 120 near the top end at which the side panel is joined with the roof panel faces generally upward. At a rear-end bottom portion 131 (an area of a bottom surface near a rear end) of the groove 130 is provided a hinge 200 configured to support a rear door 300 in a manner that permits the rear door 300 to swing relative to the vehicle body 100. The groove 130 is covered with a roof molding 600 and a cover member 700. The roof molding 600 is made of synthetic rubber, and the cover member 700 is made of plastic (resin). The cover member 700 is configured to abut on the roof molding 600 and to cover the rear-end bottom portion 131 of the groove 130.

The hinge 200 is comprised of a hinge base part 210 to be fixed on the bottom surface of the groove 130, a door hinge part 220 to be fixed to the rear door 300, and a hinge pin 230 configured to join the door hinge part 220 with the hinge base part 210 in a manner that permits the door hinge part 220 to swing on the pin 230 relative to the hinge base part 210. The hinge 200 is provided in pair at the upper right and left corners of the door frame defining a door opening 103 formed at a rear part 102 of the vehicle body 100, and configured to support the rear door 300 in a manner that permits the rear door 300 to be swung up and down so that the rear door 300 can be lifted open and lowered to a close position.

The hinge base part 210 is formed by a presswork which includes stamping sheet metal and bending a stamped-out piece into a part generally L-shaped as viewed from the rear of the vehicle. The hinge base part 210 is thus comprised of an anchor portion 211 and a coupling portion 212 raised upright from one side of the anchor portion 211. The anchor portion 211 is a portion to be fixed on the bottom surface of the groove 130 by means of two fastenings 400. The coupling portion 212 has a shaft-bearing hole through which the hinge pin 230 is to be inserted, so that the door hinge part 220 is coupled with the coupling portion 212 and swingably supported by the hinge pin 230. The hinge base part 210 is a portion which withstands a load applied when the rear door 300 is opened or closed, and thus should be formed by bending a relatively thick flat plate member made of metal while its breadth indicated by reference character "a" should be made sufficiently wide.

The door hinge part 220 is a flat plate member stamped out from sheet metal, and is provided in pair at the upper right and left corners of the rear door 300. The door hinge part 220 is comprised of an anchor portion 221 and a coupling portion 222. The anchor portion 221 is a portion to be fixed to the rear door 300 by means of door fastening bolts 501. The coupling portion 222 has a shaft-bearing hole through which the hinge pin 230 is to be inserted, so that the door hinge part 220 is coupled with the coupling portion 212 of the hinge base part 210 and swingably supported by the hinge pin 230.

In this rear part structure of a vehicle, as described in U.S. Pat. No. 7,021,698 B2 and shown in FIG. 6, the hinge base part 210 that is made of a thick flat metal plate member bent in a shape like a letter L as viewed from the rear of the vehicle to enhance its rigidity is provided so as to prevent the hinge base part 210 from deforming due to the load applied when the rear door 300 is opened or closed. For this reason, the hinge base part 210 provided on the bottom surface of the groove 130 is designed to have a breadth "a" in the transverse direction of the vehicle wide enough to withstand the load. It is to be understood that the breadth "a" should also be increased as a result of increase in the thickness "b" of the coupling portion 212 of the hinge base portion 210.

With the result that the hinge base part 210 as described above is provided in the groove 130, the groove 130 is formed to have the rear-end bottom portion 131 of which a width in the transverse direction of the vehicle becomes gradually wider toward the rear to accommodate the hinge base part 210. Consequently, the roof molding 600 having a uniform width in the transverse direction of the vehicle is not suitable to cover the opening of the groove 130 along the whole length, particularly to cover the rear-end bottom portion 131. Therefore, the cover member 700 should be provided contiguously to the rear end of the uniform-width roof molding 600 to cover the rear-end bottom portion 131 of the groove 130.

As discussed above, in a configuration where the hinge 200 is provided in the groove 130 and two members (roof molding 600 and cover member 700) are thus required to cover the groove 130, the resultant increase in the number of parts and the number of assembly steps would disadvantageously increase the manufacturing cost.

Furthermore, in a configuration where the roof molding 600 and the cover member 700 are disposed over the groove 130, disadvantageously, the structure and shape of a joint portion at which these two members 600, 700 abut each other would become complicate, and the seam of the joint portion would be exposed so that the external appearance of the vehicle could be impaired.

It would thus be deemed desirable to provide a rear part structure of a vehicle in which a hinge for a rear door is provided in a groove and the groove is covered with a single member. The present invention has been made in an attempt to overcome the above disadvantages.

Illustrative, non-limiting embodiments of the present invention overcome the above disadvantages and other disadvantages not described above. Also, the present invention is not required to overcome the disadvantages described above, and an illustrative, non-limiting embodiment of the present invention may not overcome any of the problems described above.

SUMMARY OF THE INVENTION

It is an aspect of the present invention to provide a rear part structure of a vehicle for hinging a rear door to a vehicle body at a rear end of the vehicle. This rear part structure of a vehicle comprises a hinge assembly configured to support the rear door in a manner that permits the rear door to swing about a pivot axis located in a position fixed relative to the vehicle body near an upper end of the rear door. The hinge assembly comprises a hinge base part and a door hinge part. The hinge base part is provided in a groove formed at a joint between a roof panel and a side panel of the vehicle body. The door hinge part is attached to the rear door and swingably supported by the hinge base part. The hinge base part comprises an anchor portion, a swing motion support portion and a connecting portion. The anchor portion is fixed to a bottom of the groove. The swing motion support portion is disposed in a position aligned in a longitudinal direction of the vehicle with the anchor portion and separate from the anchor portion, and configured to support the door hinge part in a manner that permits the door hinge part to swing in upward and downward directions. The connecting portion extends between the anchor portion and the swing motion support portion to fix the swing motion support portion relative to the anchor portion.

With this structure, in which the anchor portion and the swing motion support portion of the hinge base part in the hinge assembly are aligned in the longitudinal direction of the vehicle and separate from each other, the breadth of the hinge base part in a transverse direction can be designed to be smaller than the corresponding part of the structure as illustrated in FIG. 6 where the coupling portion (212) corresponding to the above swing motion support portion is aligned in the transverse direction of the vehicle with the anchor portion (211). As a result, the rear-end bottom portion of the groove in which the hinge assembly is disposed can be designed to be smaller in breadth (transverse direction of the vehicle), and thus, the groove can be designed to have a uniform width along the length. This makes it possible to use a single uniform-width roof molding to cover the whole length of the groove, thus obviating the necessity to provide a separate cover member (having a greater width) other than the roof molding, to cover the rear-end bottom portion of the groove in which the hinge base part is provided. Since the groove may be covered seamlessly with a single member (roof molding) along the whole length, a rear part structure of the vehicle is provided in which the appearance of the portion where the groove is provided may be improved. Furthermore, since the roof molding may be made of a single part, the shape of the roof molding may be made simpler, so as to contribute to reduction in the number of parts and the number of assembly steps, thus reducing the manufacturing cost.

The groove may be a mohican groove formed in an upper exterior surface of the vehicle and extending in the longitudinal (front/rear) direction of the vehicle.

The anchor portion may preferably but not necessarily comprise a flat surface configured to be in a face-to-face contact with the bottom of the groove, the flat surface extending in a transverse direction of the vehicle within the groove.

The swing motion support portion may be formed to extend in a vertical (upward-downward) direction. This vertically extending form of the swing motion support portion may server to enhance a supporting strength against loads given from the vertical direction.

The position in which the swing motion support portion is disposed may be rearward (and/or upward) relative to the anchor portion. In a specific embodiment where the swing motion support portion is disposed in the position rearward relative to the anchor portion, the principal portion of the door hinge part may be arranged outside of the vehicle body, and thus the support span (the length of overlap between the door hinge part and the rear door along which they are joined together) may be made longer. It is to be appreciated that if the position in which the swing motion support portion is disposed is rearward and upward relative to the anchor portion, the support span may be made much longer without the possibilities of interference with the vehicle body. Accordingly, the rigidity, strength and durability of the portion where the door hinge part of the hinge assembly support the rear door may be enhanced.

A breadth of the swing motion support portion in the transverse direction of the vehicle may preferably but not necessarily smaller than a breadth of the anchor portion in the transverse direction of the vehicle. With this additional feature, the swing motion support portion in the hinge assembly may be designed to have a smaller dimension in the transverse direction of the vehicle, and it is thus possible to open up a space for use in providing another part, e.g., the door hinge part. Accordingly, the groove is not required to have an increased width in a portion where the hinge assembly is provided, so that the groove may be designed to have a uniform width along the length.

The anchor portion, the swing motion support portion and the connecting portion may preferably but not necessarily be integrally formed and thus provided in a single molded piece. With this additional feature, since the hinge base part of the hinge assembly may be made of a single molded piece, the structure and shape thereof may be simplified. Consequently, the number of parts may be reduced and the number of assembly steps may be reduced and thus the manufacturing cost can be saved. Moreover, the rigidity of the hinge base part may be enhanced, and the moldable design flexibility may be improved.

The above rear part structure of a vehicle, with or without additional features described above, may further comprise a fastening for use in fixing the anchor portion of the hinge base part to the bottom of the groove, and a roof molding provided on the groove may be fixed by the same fastening to the vehicle body. With this additional feature, since the roof molding provided on the groove is fixed by the same fastening as is used when the anchor portion of the hinge base part in the hinge assembly is fixed to the bottom of the groove, the structure and shape of the hinge may be simplified. Consequently, the number of parts may be reduced and the number of assembly steps may be reduced and thus the manufacturing cost can be saved. Moreover, the rigidity of the portion at which the hinge assembly and the roof molding are mounted may be enhanced.

In the above rear part structure of a vehicle, with or without additional features described above, the door hinge part of the hinge assembly may be disposed in a position outward in the transverse direction of the vehicle relative to the swing motion support portion. With this additional feature, the support span (distance between the points of support at which the right and left door hinge parts are swingably supported relative to the vehicle body) between the door hinge parts provided at both sides of the rear door may be as long as possible.

Accordingly, the rigidity, strength and durability of the portion where the hinge assembly support the rear door may be enhanced.

BRIEF DESCRIPTION OF THE DRAWINGS

The above aspects, other advantages and further features of the present invention will become more apparent by describing in detail illustrative, non-limiting embodiments thereof with reference to the accompanying drawings, in which.

DETAILED DESCRIPTION OF THE EXEMPLARY EMBODIMENTS

A description will be given of a rear part structure of a vehicle according to exemplary embodiments of the present invention with reference to FIGS. 1 through 5. In describing the exemplary embodiments of the present invention, the term "front" or "frontward" is used to refer to the direction in which the vehicle moves ahead, "rear (back)" or "rearward (backward)" to the direction in which the vehicle moves back, "upper" or "upward" to the vertically upward direction, "lower" or "downward" to the vertically downward direction, and "transverse (right and left)" to the transverse direction of the vehicle.

<Structure of Vehicle>

Figure 1:
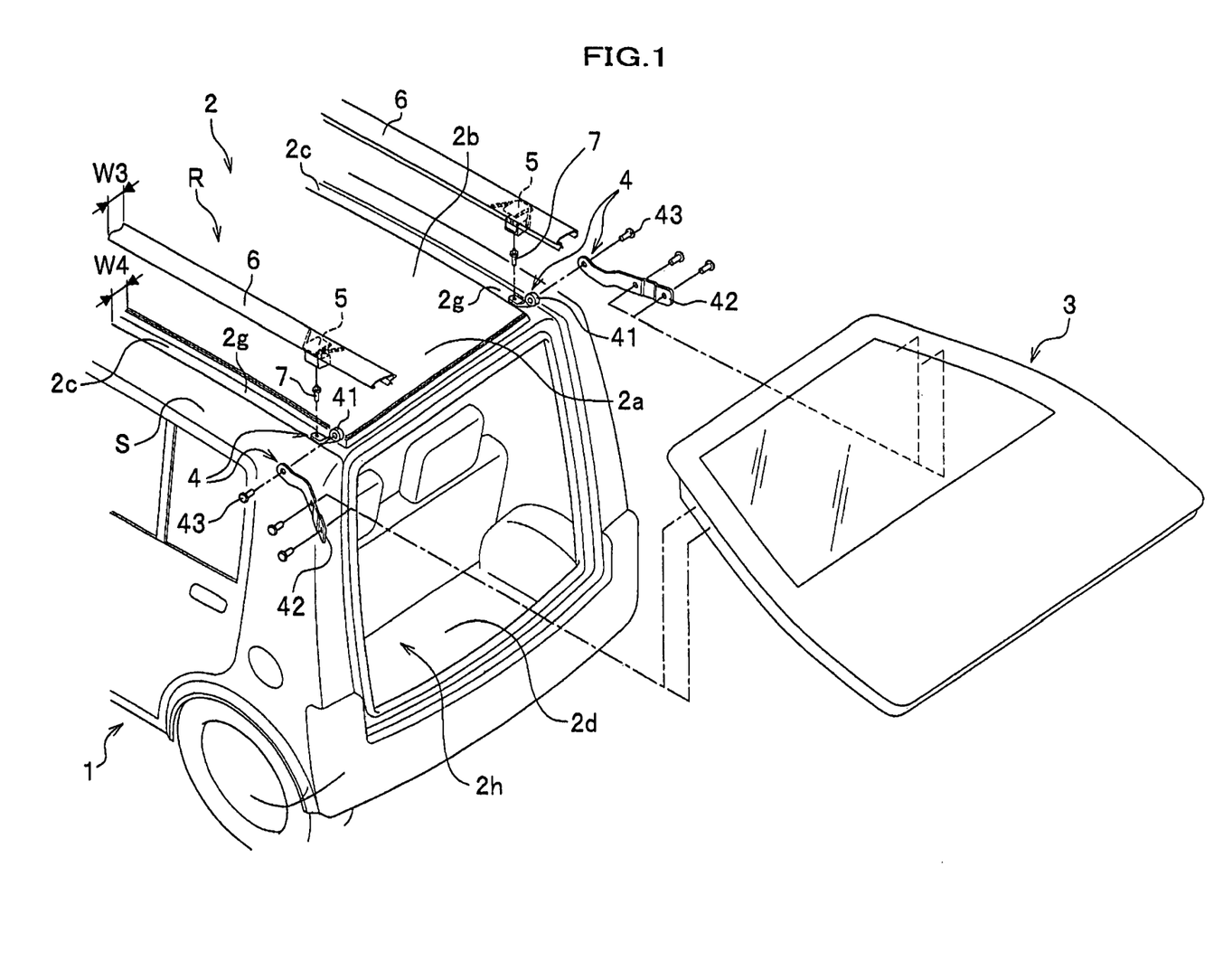
FIG. 1 is an exploded perspective view of a rear part of a vehicle, for illustrating a rear part structure of the vehicle according to an exemplary embodiment of the present invention.

As shown in FIG. 1, a vehicle 1 is, for example, a minivan, a station wagon or a hatchback. At a rear part 2a of a vehicle body 2 is provided a hatchback-type rear door 3 with a hinge structure (comprised of a pair of hinges 4) allowing the rear door 3 to open upwards. The vehicle 1 is not limited in type or shape as long as the rear part 2a of the vehicle body 2 has such a rear door 3. The hinge 4 corresponds to "hinge assembly" in the appended claims.

<Structure of Vehicle Body>

In the rear part 2a of the vehicle body 2, as shown in FIG. 1, formed at its rear end is a door opening 2d, which is closed or opened by the operation of the rear door 3. Starting from upper right and left corners of a door frame which defines the opening 2d, two grooves 2c formed in an upper surface of a roof portion 2b of the vehicle body 2 extend parallel to each other toward the front of the vehicle 1. A hinge base part 41 of the hinge 4 is fixed to a rear-end bottom portion 2g of each groove 2c, and a door hinge part 42 fixed to the rear door 3 is swingably attached to the hinge base part 41, so that the rear door 3 is swingable on the hinge 4 and thus allowed to open and close the door opening 2d. In a compartment of the rear part 2a of the vehicle body 2 is formed a deck 2h which may have a freight loaded or unloaded through the opening 2d while the rear door 3 lifted up is being kept open.

[Structure of Roof Portion]

As shown in FIG. 1, the roof portion 2b is a portion making up a roof of the vehicle body 2, and is comprised of a roof panel R and upper end portions of side panels S that are joined to the right and left edges (at both sides facing to the outsides in the transverse direction of the vehicle 1) of the roof panel R, respectively. The right and left edges of the roof panel R are joined to upper ends of the side panels S respectively by welding. Their joints between the roof panel R and the respective side panels S extend along the side edges (facing to the outsides in the transverse direction of the vehicle 1) of the roof portion 2b of the vehicle body 2 in a longitudinal (front/rear) direction, to form the grooves 2c each of which has a substantially rectangular cross section and opens upward at an upper exterior surface of the vehicle 1 (the roof portion 2b of the vehicle body 2), and is thus called "mohican groove".

[Structure of Groove]

The grooves 2c in this embodiment as shown in FIG. 1 are formed at the upper surface of the roof portion 2b, extend in the longitudinal (front/rear) direction of the vehicle 1 along its side edges from a front end at which it abuts on the upper edge of the windshield (not shown), to a rear end at which it abuts on the upper edge of the door frame defining the door opening 2d. Each groove 2c is a long narrow recess having a uniform width W2 in the transverse direction of the vehicle 1 along the whole length. The groove 2c is covered with a single roof molding 6 placed on the entire opening of the groove 2c, so that a molding mounting clip 5 is hidden beneath the roof molding 6.

[Structure of Rear Door]

The rear door 3 in this embodiment as shown in FIG. 1 is a door for use in opening and closing the door opening 2d, and formed principally by hemming and other shaping processes of an outer panel and an inner panel each of which is made of rolled steel. The rear door 3 is supported at its upper end, swingably on the hinge 4 relative to the vehicle body 2. At the upper right and left side surfaces 3a (facing to the outsides in the transverse direction of the vehicle 1) of the rear door 3 are provided door hinge parts 42 which are swingably attached by hinge pins 43 to the hinge base parts 41, respectively. At the left side edge of the door opening 2d is swingably provided an open stay (not shown) which is configured to hold the rear door 3 in an open position or to damp an abrupt movement of the rear door 3.

The open stay is configured to help open or close the hatchback-type rear door 3 by providing a force adjusted to act as a balance of the weight of the rear door 3. The open stay serves to reduce loads applied to the hinge 4 when the rear door 3 is opened or closed. For that end, the open stay includes a gas spring (not shown). The open stay has one end attached to the vehicle body 2 near a portion (rear end bottom portion 2g) where the hinge base part 41 is fixed, and the other end attached to the side surface of the rear door 3.

<Structure of Hinge (Hinge Assembly)>

Figure 2:
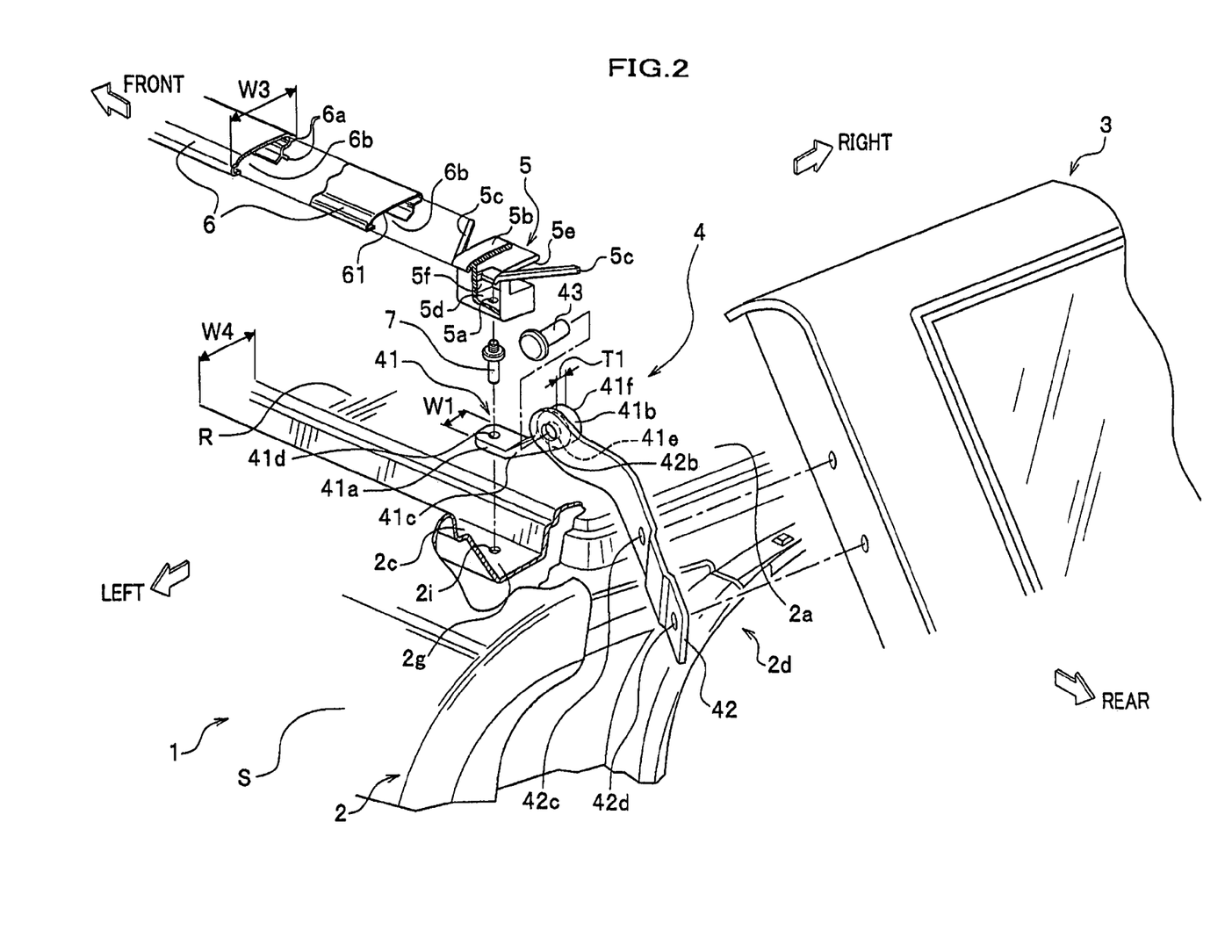
FIG. 2 is an exploded and magnified perspective view of a principal portion of the rear part of the vehicle with a rear door mounted thereto, for illustrating the rear part structure of the vehicle according to the exemplary embodiment of the present invention.

To illustrate how a rear door is mounted to a rear part of a vehicle, reference is made to FIG. 2 that is an exploded and magnified view of a principal portion of the rear part of the vehicle with the rear door mounted thereto, according to an exemplary embodiment of the present invention.

As shown in FIG. 2, the hinge 4 is a jointed device on which the rear door 3 is swingable about a pivot axis located at the upper door frame defining the door opening 2d of the vehicle body 2 (i.e., in a position fixed relative to the vehicle body 2 near an upper end of the rear door 3) so that the rear door 3 may be lifted open or lowered to a closed position. The hinge 4 may be made of casting, for example. The hinge 4 comprises a hinge base part 41, a door hinge part 42 and a hinge pin 43. The hinge base part 41 is a part to be fixed to the groove 2c of the vehicle body 2. The door hinge part 42 is a part to be swingably supported by the hinge base part 41 and attached to the rear door 3. The hinge pin 43 is a part by which the hinge base part 41 and the door hinge part 42 are joined together and on which they are swingable relative to each other.

[Structure of Hinge Base Part]

Figure 3:
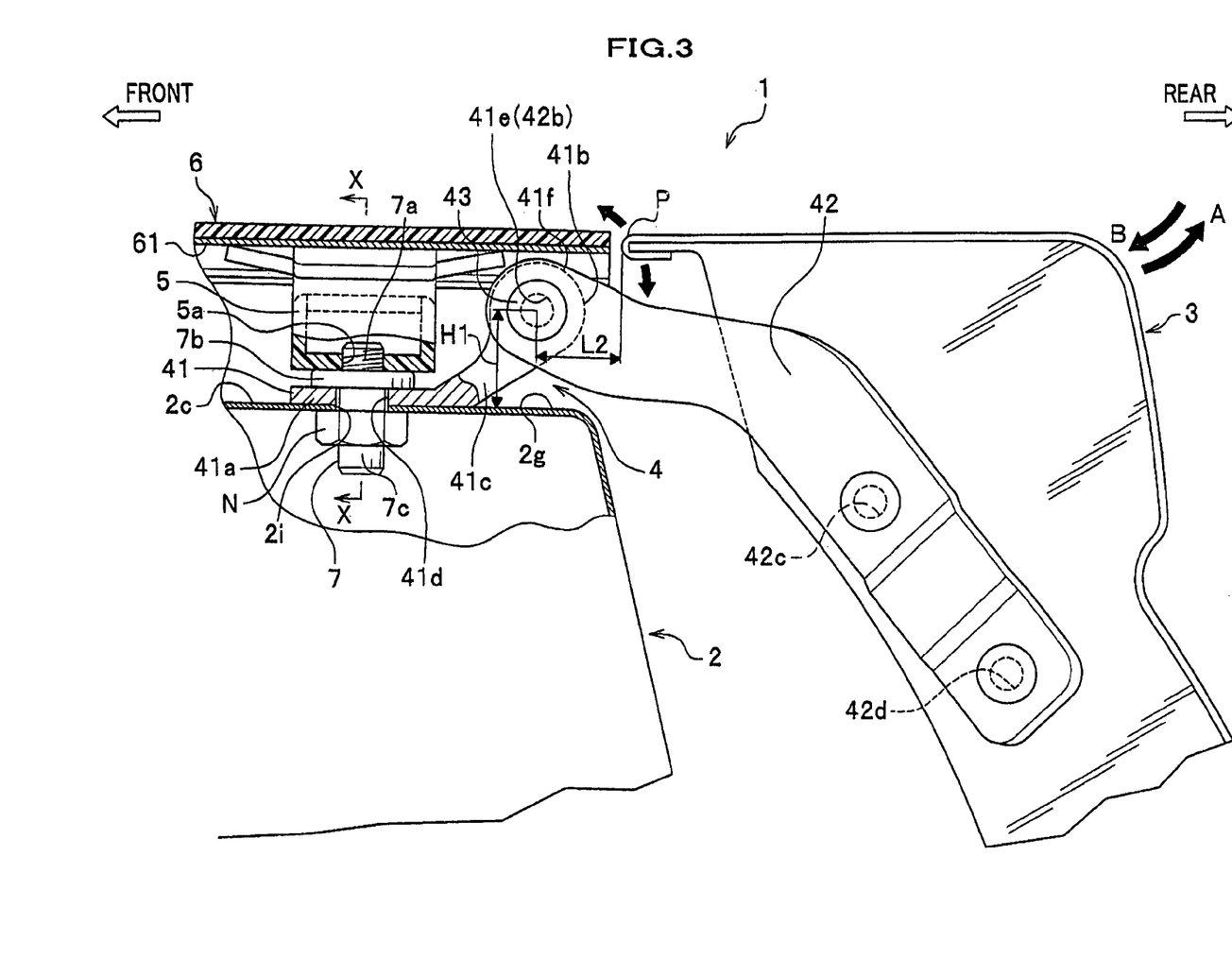
FIG. 3 is a magnified sectional view of a principal portion of the rear part of the vehicle with a hinge assembly mounted thereto, for illustrating the rear part structure of the vehicle according to the exemplary embodiment of the present invention.

To illustrate how a hinge assembly is mounted to a vehicle, reference is made to FIG. 3 that is a magnified sectional view of a principal portion of a rear part of the vehicle with the hinge assembly mounted thereto, according to an exemplary embodiment of the present invention.

As shown in FIG. 3, the hinge base part 41 is one of a pair of metal members making up the hinge 4, which is attached to the vehicle body 2, and made of metal plate formed by casting, for example. The hinge base part 41 comprises an anchor portion 41a, a swing motion support portion 41b and a connecting portion 41c. The anchor portion 41a is a portion disposed in a frontward position and the swing motion support portion 41b is a portion disposed in a rearward position when the hinge base part 41 is attached to the vehicle body 2. The connecting portion 41c is a portion extending between the swing motion support portion 41b and the anchor portion 41b.

The anchor portion 41a, swing motion support portion 41b and connecting portion 41c of the hinge base part 41 are integrally formed and thus provided in a single molded piece, which is shaped like a crooked strip such that it is bent at about the midpoint thereof as viewed from the side of the vehicle. As the hinge base part 41 is viewed from the side of the vehicle, the connecting portion 41c is disposed substantially in its midsection, the anchor portion 41a is disposed on the "front" side of the connecting portion 41c, and the swing motion support portion 41b is disposed in an upward position on the "rear" side of the connecting portion 41c. In this way, the anchor portion 41a and the swing motion support portion 41b are aligned in a longitudinal direction of the vehicle 1 separately from each other with the connecting portion 41c placed between the anchor portion 41a and the swing motion support portion 41b.

The hinge base part 41 is tightly fixed to the upper door frame defining the door opening 2d of the vehicle body 2 by a fastening 7. The fastening 7 is applied to fix the anchor portion 41a of the hinge base part 41 on the rear end bottom portion 2g of the groove 2c from upward. The fastening 7 is also used to fix the roof molding 6 on the groove 2c through the molding mounting clip 5. The swing motion support portion 41b of the hinge base part 41 is located at a rear end of the hinge base part 41, and joined to the door hinge part 42 by the hinge pin 43 in a manner that permits the door hinge part 42 to swing on the hinge pin 43. The roof molding 6 is configured to cover the groove 2c and placed flush with the upper surface of the roof panel R (see FIG. 4) over the hinge base part 41 with the molding mounting clip 5 disposed therebetween.

The anchor portion 41a of the hinge base part 41 is a horizontally-extending flat plate having a flat surface configured to be in a face-to-face contact with the bottom of the groove 2c, and disposed in a position frontward relative to the swing motion support portion 41b. The flat surface may extend in the transverse direction of the vehicle within the groove 2c. From the rear end of the anchor portion 41a, the connecting portion 41c extends rearward and upward, to connect to the swing motion support portion 41b, so that the hinge base part 41 is shaped substantially like a letter L as viewed from the side of the vehicle 1 (see FIG. 5).

Figure 4:
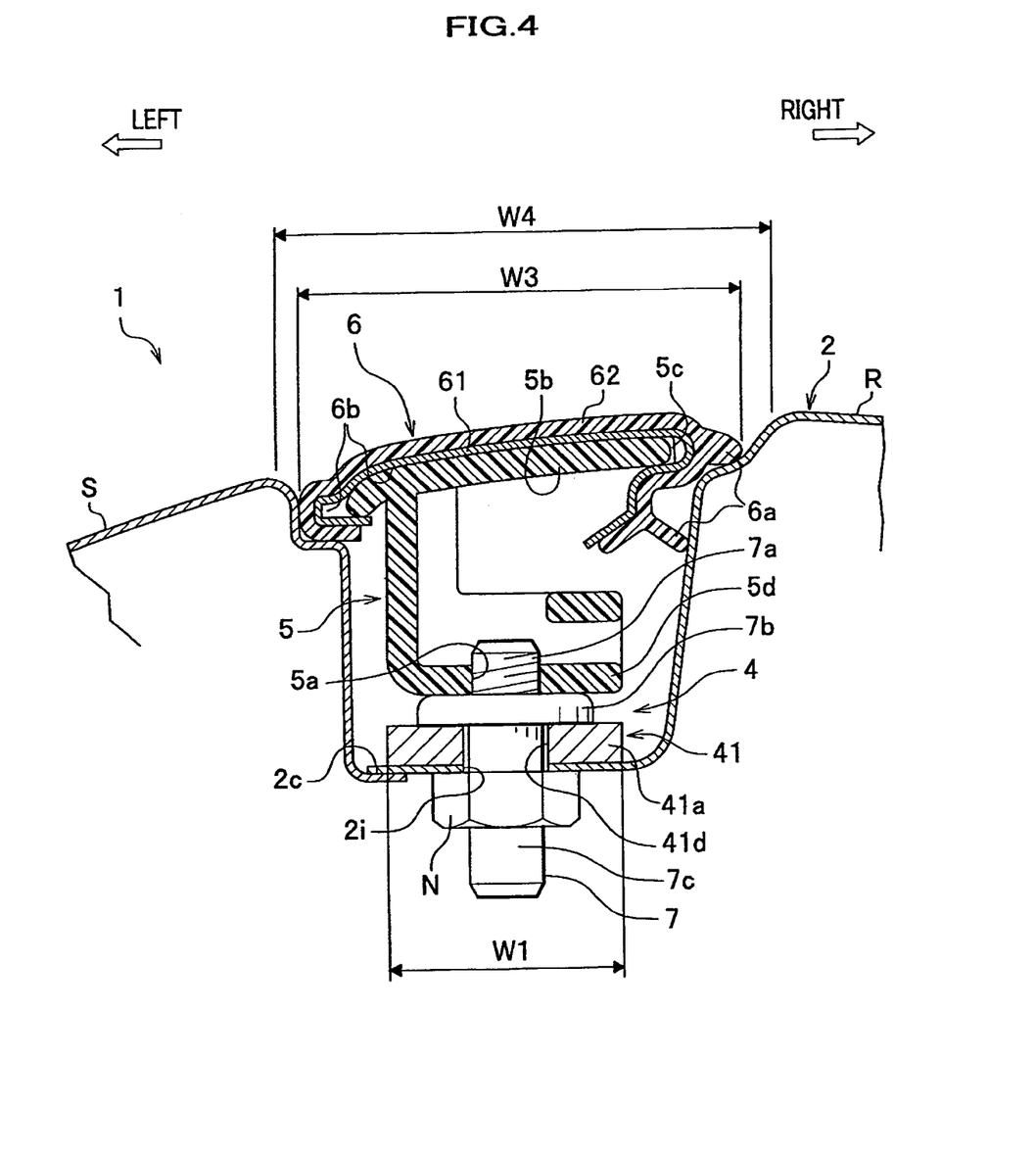
FIG. 4 is a sectional view taken along line X-X as viewed from the direction indicated by arrows X of FIG. 3.

Referring now to FIG. 4, which is a sectional view taken along line X-X as viewed from the direction indicated by arrows X of FIG. 3, and to FIG. 5, which is a magnified perspective view of a hinge base part of a hinge assembly according to an exemplary embodiment of the present invention, the anchor portion 41a, swing motion support portion 41b and connecting portion 41c of the hinge base part 41 will be described in more detail.

As shown in FIG. 4, the anchor portion 41a is a portion of the hinge base part 41 which is shaped like a horizontally-extending flat plate and configured to be fixed in contact with the bottom surface of the groove 2c. The anchor portion 41a has substantially in its center a fixing hole 41d through which the fastening 7 is inserted. The fastening 7 has a bolt portion 7c, a head portion 7b and an external thread portion 7a projecting upwardly (in a direction opposite to that in which the bolt portion projects) from a head portion 7b. The anchor portion 41a is fixed for example by a single piece of the fastening 7. To be more specific, the bolt portion 7c is inserted through the fixing hole 41d of the hinge base part 41 while the external thread portion 7a is snapped (inserted and engaged) into an engageable hole 5a of the molding mounting clip 5, and a nut N or the like is used on a tip end portion the bolt portion 7c inserted further through an installation hole 2i formed in the rear end bottom portion 2g of the groove 2c to fasten the hinge base part 41 to the vehicle body 2.

Figure 5:
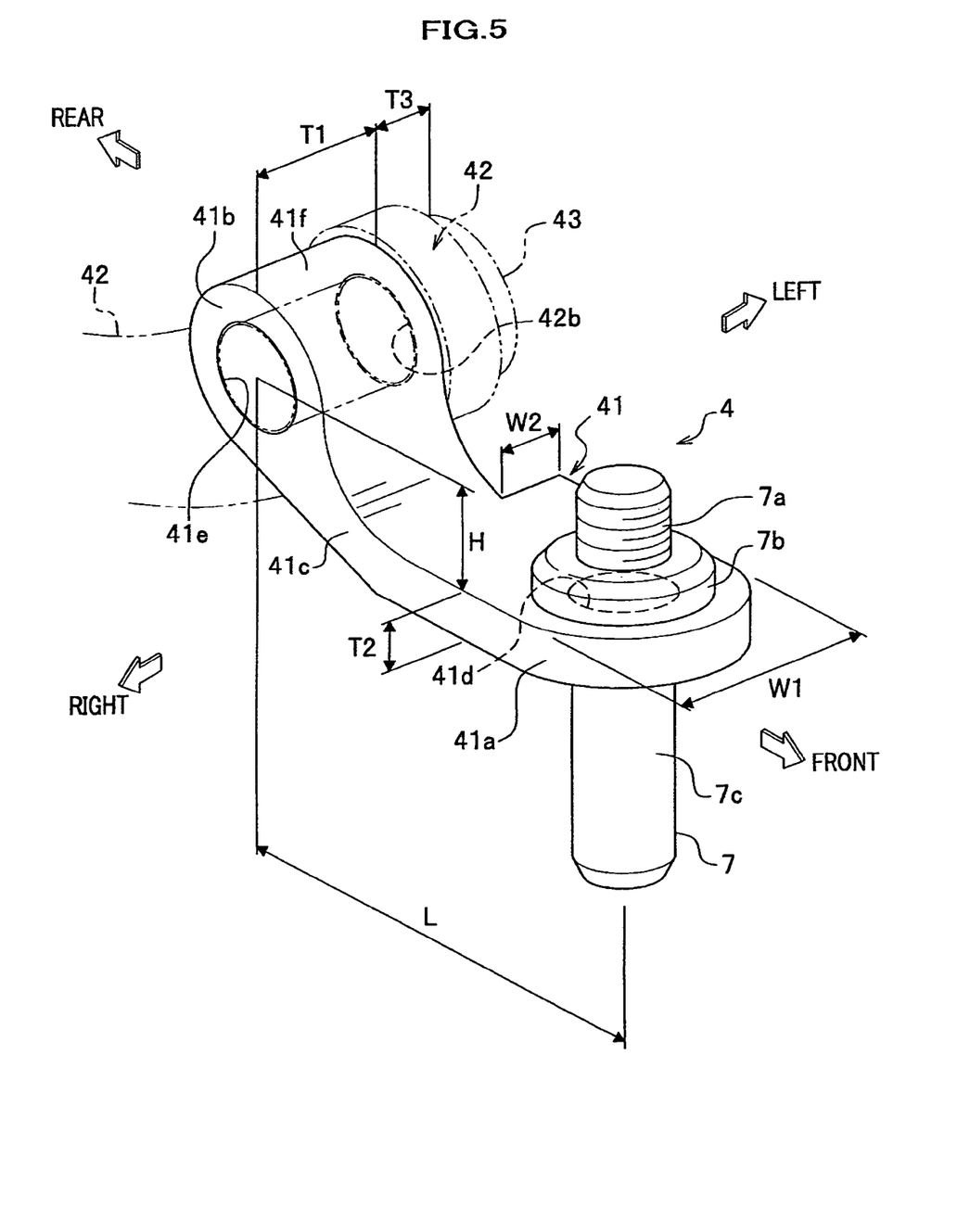
FIG. 5 is a magnified perspective view of a hinge base part of the hinge assembly, for illustrating the rear part structure of the vehicle according to the exemplary embodiment of the present invention.

As shown in FIG. 5, the swing motion support portion 41b is a coupling portion at which the door hinge part 42 is swingably coupled to the hinge base part 41 and which is configured to support the door hinge part 42 (and the rear door 3 fixed thereto) by the hinge pin in a manner that permits the door hinge part 42 (rear door 3) to swing on the hinge pin 43. The swing motion support portion 41b comprises a shaft bearing cylindrical portion 41f having a shaft bearing hole 41e formed in the transverse direction of the vehicle 1. The hinge pin 42 is inserted through the shaft bearing hole 41e of the shaft bearing cylindrical portion 41f of the swing motion support portion 41b and through the a shaft bearing hole 42b of the door hinge part 42, so that the door hinge part 42 is swingably supported relative to the hinge base part 41. On the shaft bearing cylindrical portion 41f is continuously formed the connecting portion 41c which will be described below.

The connecting portion 41c is a portion connecting the anchor portion 41a and the swing motion support portion 41b. The thickness of the connecting portion 41c in the vertical direction is configured to become greater gradually from the anchor portion 41a toward the swing motion support portion 41b.

The next discussion is directed to the relative dimensions of each portion of the hinge base part 41.

As shown in FIG. 5, the swing motion support portion 41b has a thickness T1 in the transverse direction of the vehicle 1 smaller than a breadth W1 of the anchor portion 41a in the transverse direction of the vehicle 1. More specifically, the thickness T1 of the swing motion support portion 41b is the breadth W1 of the anchor portion 41a minus length W2 (T1=W1−W2: the thickness T1 is smaller than W1 by length W2).

In the swing motion support portion 41b, the thickness T1 of the shaft bearing cylindrical portion 41f in the transverse direction of the vehicle 1 is greater than a thickness T2 of the anchor portion 41a. The shaft bearing hole 41e of the shaft bearing cylindrical portion 41f and the fixing hole 41d of the anchor portion 41a are separated by the connecting portion 41c in a longitudinal direction of the vehicle 1 with a distance L kept therebetween.

Supposing that the shaft bearing cylindrical portion 41f of the swing motion support portion 41b has the thickness T1 in the transverse direction of the vehicle 1 and a portion around the shaft bearing hole 42b of the door hinge part 42 disposed in the axial direction adjacent to the shaft bearing cylindrical portion 41f has a thickness T3 smaller than the length W2, the hinge 4 disposed in the groove 2c as a whole may be designed to have the breadth W1.

The shaft bearing hole 41e of the shaft bearing cylindrical portion 41f is disposed in a position at a height H from the top surface of the anchor portion 41a. Therefore, the shaft bearing cylindrical portion 41f is formed at the rear end of the hinge base part 41 which is bent between the anchor portion 41a laid horizontally on the rear bottom portion 2g and the connecting portion 41c extending obliquely upward toward rearward, as shown in FIG. 3, within the groove 2c. The shaft bearing cylindrical portion 41f is located over the rear end bottom portion 2g at a substantially middle position in the vertical direction within the groove 2c.

<Structure of Fastening>

The fastening 7 is a member for securely fixing the hinge base part 41 and the molding mounting clip 5 to the vehicle body 2, and comprised of a single weld bolt, for example. The fastening 7 comprises a head portion 7b shaped like a flange, an external thread portion 7a protrusively formed on the head portion 7b and engageable with the engageable hole 5a of the molding mounting clip 5, and a bolt portion 7c protrusively formed under the head portion 7b and to be inserted through the fixing hole 41d of the hinge base part 41 and the installation hole 2i of the vehicle body 2 so as to fasten the hinge base part 41 to the vehicle body 2, all of which portions 7a, 7b, 7c are provided in a single piece (see FIG. 4). The fastening 7 may be of any member without limitation in type, material, shape and other properties, as long as it can be used to fix the hinge base part 41 and the molding mounting clip 5 to the vehicle body 2. The fastening 7 may include a rivet, a screw, etc., for example.

[Structure of Door Hinge Part]

As shown in FIG. 3, the door hinge part 42 is a thick flat plate member made of metal which is shaped substantially like a crooked strip as viewed from the side of the vehicle. The door hinge part 42 is also crooked toward the outside in the transverse direction of the vehicle as viewed from the top of the vehicle, as shown in FIG. 2. The door hinge part 42 is bent at a midpoint and thus has two portions extending in different directions: a front portion extending parallel to the directions in which the rear door 3 is opened and closed (as indicated by arrows A and B); and a rear portion extending from the rear end of the front portion toward the outside in the transverse direction of the vehicle, substantially parallel to the front-rear direction of the vehicle along the side surface 3a of the rear door 3. The front portion has, at its front-end portion, the shaft bearing hole 42b through which the hinge pin 43 is inserted, and at its substantially middle portion and its rear-end portion, a through hole 42c for installing a bolt and a through hole 42d for installing a bolt configured to be tightened while the mounting position of the rear door 3 is being adjusted, respectively. The door hinge part 42 is disposed in a position outward in the transverse direction of the vehicle 1 relative to the swing motion support portion 41b, and configured to swing on the hinge pin 43 together with the rear door 3.

The hinge pin 43 is, for example, a metal shaft member shaped like a rivet, which couples the hinge base part 41 and the door hinge part 42 in a relatively swingable manner. The hinge pin 43 may be used with a bush made of oreoresin or oil impregnated sintered metal, etc. fitted in the shaft bearing hole 41e, 42b so that the hinge assembly may be made oilless and thus maintenance-free.

<Structure of Roof Molding>

The roof molding 6 is, as shown in FIG. 4, a lid for covering and concealing the groove 2c, which also serves to cover the hinge base part 41 an the molding mounting clip 5. The roof molding 6 is made principally of a substantially plate-shaped rubber or synthetic resin material contoured to fit the shape of the opening of the molding 2c. The roof molding 6 is a long member having a uniform width and extending in a longitudinal direction of the vehicle 1 from the front end to the rear end of the roof portion 2b, and is so configured that the opening of the groove 2c can be covered entirely along the length by a single member.

The roof molding 6 is comprised of a plastic member 62 and a reinforcing member 61. The plastic member 62 is shaped generally like a letter C in a compressed form in cross section. The reinforcing member 61 is made of a flat metal plate bent and formed to fit an undersurface of the plastic member 62. The roof molding 6 comprises a lip portion 6a and an engageable recess 6b. The lip portion 6a is pressed against a sidewall of the groove 2c at a position near the opening of the groove 2c (and near a stepped portion thereof). The engageable recess 6b is a recessed portion in which a molding fitting portion 5b of the molding mounting clip 5 is fitted. The roof molding 6 is mounted to the vehicle body 2 by fitting the molding fitting portion 5b of the molding mounting clip 5 into the engageable recess 6b and fastening the molding mounting clip 5 and the anchor portion 41a of the hinge 4 to the vehicle body 2 by the fastening 7.

[Structure of Molding Mounting Clip]

As shown in FIG. 4, the molding mounting clip 5 is an auxiliary fastening device for use with the fastening 7 to fasten the roof molding to the groove 2c of the vehicle body 2, and applied so as to prevent the fastening 7 from being exposed to the outside of the vehicle 1. The molding mounting clip 5, as shown in FIG. 2, comprises a molding fitting portion 5b, an elastic projection 5c and a bottom plate portion 5d which are provided in a single molded piece. The molding fitting portion 5b and the elastic projection 5c is formed in an upper side of the molding mounting clip 5, and the bottom plate portion 5d, which is shaped like a flat plate, is formed in a lower side of the molding mounting clip 5, whereas a hollow space 5f is formed in a midsection of the molding mounting clip 5 between the bottom plate portion 5d and the molding fitting portion 5b. The molding mounting clip 5 is made of elastic material such as hard rubber or synthetic resin, and shaped substantially like a letter U laid with its open side facing to the right as viewed from the rear of the vehicle 1 (see FIG. 4).

Referring now to FIG. 2, each portion of the molding mounting clip 5 will be described one by one in more detail.

The molding fitting portion 5b is a flat plate to be press-fitted into the engageable recess 6b shaped substantially like a letter C with its both sides engaged in the engageable portions of the recess 6b, so that the molding mounting clip 5 is installed to the roof molding 6.

The elastic projection 5c, of which two are provided in pair in this embodiment, is a substantially rod-like member provided on one end (opposite the side where a window 5e is provided) of each side of the molding fitting portion 5b facing toward the front or rear of the vehicle, and configured to project from the one end frontward or rearward obliquely toward the other-end side of the roof molding 6, so that the tip end of each elastic projection 5c is pressed in contact with the inner end face of the engageable recess 6b and elastically held without rattle when the molding mounting clip 5 is fitted in the engageable recess 6b of the roof molding 6.

The bottom plate portion 5d is a portion in which is provided the engageable hole 5a through which the external thread portion 7a of the fastening 7 is inserted and engaged. The bottom plate portion 5d is a flat thick plate formed at the bottom of the molding mounting clip 5 and disposed horizontally on the anchor portion 41a when the molding mounting clip 5 is installed in the groove 2c.

The window 5e is formed between the bottom plate portion 5d and the molding fitting portion 5b, to open at its three sides toward the longitudinal center line of the roof portion 2b, toward the front and toward the rear.

A hollow space 5f formed between the molding fitting portion 5b and the bottom plate portion 5d serves to make the molding fitting portion 5b elastically deformable so that the roof molding 6 may be fitted onto the molding fitting portion 5b of the molding mounting clip 5 with increased ease. The hollow space 5f is enclosed with a sidewall which connects the molding fitting portion 5b and the bottom plate portion 5d. The sidewall has a midsection partially cutaway at three sides to form the window 5e.

In one exemplary and non-limiting embodiment, though not specifically illustrated herein, where a nut is provided on the external thread portion 7a of the fastening 7 to securely fasten the molding mounting clip 5 onto the anchor portion 41a, the window 5e may serve to provide an installation service opening, so that the molding fitting portion 5b configured to be elastically deformable as described above may be warped upward with its window 5e side raised upward to widen the installation service opening when the nut is fitted on the external thread portion 7a, to facilitate installation of the nut onto the fastening 7.

[Operations and Advantages]

The operations and advantages of the rear part structure of a vehicle according to an exemplary embodiment of the present invention will be described hereafter with reference to assembly steps thereof.

As shown in FIG. 2, when a rear door 3 is mounted to a rear part 2a of a vehicle body 2, a hinge base part 41 and a door hinge part 42 of a hinge 4 are first coupled with each other by a hinge pin 43 in a manner that permits these parts 41, 42 to swing relative to each other on the hinge pin 43.

Next, a bolt portion 7c of a fastening 7 (see FIG. 4) is inserted through a fixing hole 41d of the hinge base part 41 and through an installation hole 2i of the vehicle body 2.

Then, the bolt portion 7c of the fastening 7 is fastened to the vehicle body 2 with a nut N screwed thereon, so that an anchor portion 41a of the hinge base part 41 is fixed onto a rear end bottom portion 2g of a groove 2c.

Subsequently, an engageable hole 5a of a molding mounting clip 5 is engaged with an external thread portion 7a of the fastening 7 to install the molding clip 5 onto the anchor portion 41a of the hinge base part 41.

The fastening 7 which serves to fasten the anchor portion 41a of the hinge 4 to the vehicle body 2 also serves to fix the molding mounting clip 5 to the vehicle body 2. Since a single member doubles the parts of fastening for the hinge base part 41 and fastening for the molding mounting clip 5, the number of parts and the number of steps for fastening is reduced, and thus the working efficiency may be improved.

The head portion 7b of the fastening 7 is arranged and concealed under the molding mounting clip 5, and is thus not seen from outside. Furthermore, the head portion 7b of the fastening 7 is covered with the molding mounting clip 5 and is thus protected from extraneous matter which would otherwise be brought into contact with the head portion 7b. As a result, the durability of the fastening 7 may be enhanced.

Next, the roof molding 6 is fitted onto the groove 2c from above in such a manner that the right side of the engageable recess 6b is fitted on the right side of the molding mounting clip 5 (elastic projection 5c and molding fitting portion 5b), and then the left side of the engageable recess is snapped on the left side of the molding mounting clip 5. In this way, the roof molding 6 is fixed to the molding mounting clip 5. Accordingly, the roof molding 6 is mounted on the vehicle body 2 through the molding mounting clip 5 with a single operation to thereby close the opening of the groove 2c.

As shown in FIGS. 3 and 4, the welded junction between the roof panel R and the side panel S, the fastening 7, the groove 2c, and the front end portions of the hinge base part 41 and the door hinge part 42 are concealed from the outside by the roof molding 6 so that the external appearance of the roof portion 2b (see FIG. 1) of the vehicle 1 may be improved.

The upper surface of the roof molding 6 is, as shown in FIG. 4, provided flush with the upper surfaces of the roof panel R and the side panel S, and may thus be designed to fit the external appearance of the roof portion 2b. Accordingly, the beautiful appearance may be enhanced.

Next, a piston rod of the open stay (not shown) is swingably installed at the edge of the door opening 2d. A tube cylinder of the open stay is then attached swingably to the side surface 3a of the rear door 3.

Next, as shown in FIGS. 1 and 2, with the rear door 3 kept open, a bolt (not shown) is inserted through through holes 42c, 42d of the door hinge part 42 and screwed down onto the rear door 3 so that the rear door 3 is temporarily retained and the position of the rear door 3 is adjusted and properly positioned. Thereafter, the fastening bolt (not shown) is tightened so that the door hinge part 42 is securely fastened to the rear door 3.

The hinge 4 mounted to the vehicle body 2 and to the rear door 3 in a way described above is disposed such that the anchor portion 41a and the swinging motion support portion 41b are aligned in a longitudinal direction of the vehicle 1 and separate from each other with the connecting portion 41c put therebetween, as shown in FIG. 5. Therefore, the breadth W1 of the hinge base part 41 in the transverse direction of the vehicle 1 can be designed to be smaller. Accordingly, the width W4 of the groove 2c at the rear part 2a of the vehicle 1 is not required to be widened.

As a result, as shown in FIGS. 2 and 4, the width W4 of the groove 2c in which the hinge base part 41 is installed and the width W3 of the roof molding 2c may be designed to be smaller. Thus, the groove 2c and the roof molding 6 may be designed to have a uniform width W2, W3 along the length. This makes it possible to use a single uniform-width roof molding 6 to cover the whole length of the groove 2c, thus obviating the necessity to provide a separate cover member (having a greater width, such as element 700 shown in FIG. 6) other than the roof molding 6, to cover the hinge 4. As a result, the number of parts and the number of assembly steps can be reduced.

The door hinge part 42 is disposed, as shown in FIGS. 1 and 2, in a position outward in the transverse direction of the vehicle 1 relative to the swing motion support portion 41b (which is disposed, as shown in FIG. 3, in a position rearward in the longitudinal direction of the vehicle 1, and upward in the vertical direction, relative to the anchor portion 41a). Since the door hinge part 42 is in a position outward in the transverse direction of the vehicle 1 relative to the swing motion support portion 41b of the hinge base part 41, the support span (distance between the points of support at which the right and left door hinge parts are swingably supported relative to the vehicle body 2) between the door hinge parts provided at both sides of the rear door 3 may be longer. Furthermore, since the swing motion support portion 41b is in a position rearward and upward relative to the anchor portion 41a, the support span (the length of overlap between the door hinge part 42 and the rear door 3 along which they are joined together, i.e., distance between through holes 42c and 42d) may be longer without interference with the vehicle body 2. Accordingly, the rigidity and holding strength the hinge 4 may apply to the rear door 3 may be improved.

Next, referring to FIG. 3, the operation of opening and closing the rear door 3 will be described more in detail.

As shown in FIG. 3, when the rear door 3 is opened, the rear door 3 and the door hinge part 42 are swung together about the hinge pin 43 disposed at the rear end portion of the vehicle body 4 in a direction indicated by arrow A. In this operation, the rear door 3 is slowly lifted open by the action of the open stay (not shown).

A parting P at the upper edge of the rear door 3 is also swung about the hinge pin 43 in the direction indicated by arrow A. In this operation, the parting P is located in a rearward position distance L2 apart from the hinge pin 43, and thus trajectory of its swinging motion is above the level of the roof portion 2b (see FIG. 1). Accordingly, the parting P of the rear door 3 never interferes with the vehicle body 2 during its swinging motion.

The swing motion support portion 41b disposed in a position upward relative to the rear end bottom portion 2g of the groove 2c in the vehicle body 2 may be designed to be lower in height H, because it is disposed in a position rearward relative to the anchor portion 41a. Accordingly, the height from the rear end bottom portion 2g of the groove 2c to the upper surface of the roof portion 2b, i.e., depth H2 of the groove 2c, may be designed smaller.

As a result, the hinge 4 for opening and closing the rear door 3 consistent with the present invention can be installed in even a shallow groove 2c.

Consequently, the rear part 2a of the vehicle body 2 can enjoy flexibility in design in terms of shapes and dimensions of the opening 2d, without severe restrictions.

When the rear door 3 is swung in a direction indicated by arrow B, as shown in FIG. 3, to close the door opening 2d, the door hinge part 42 is swung in a direction of extension of both sides (shearing direction) of the door hinge part 42. Since the direction of extension of the both sides of the door hinge part 42 coincides with the swinging direction of the rear door 3, the force applied to the door hinge part 42 when the rear door 3 is opened or closed is the direction of extension of the both sides of the door hinge part 42.

The swinging motion support portion 41b of the hinge base part 41 has a thickness gradually increasing from the anchor portion 41a through the connecting portion 41c to the shaft bearing cylindrical portion 41f, and thus exhibits a great strength.

Accordingly, the hinge 4 has a great strength with respect to the direction in which the rear door 3 is opened or closed, and thus exhibits a considerably increased rigidity, while the hinge base part 41 and the door hinge part 42 may be miniaturized.

The rear part structure of a vehicle consistent with the present invention is not limited to particular embodiments as illustrated above. It is contemplated that numerous modifications may be made to the exemplary embodiments of the invention without departing from the spirit and scope of the embodiments of the present invention as defined in the following claims.

What is claimed is:

1. A rear part structure of a vehicle for hinging a rear door to a vehicle body at a rear end of the vehicle, comprising:
   a hinge assembly configured to support the rear door in a manner that permits the rear door to swing about a pivot axis located in a position fixed relative to the vehicle body near an upper end of the rear door,
   wherein the hinge assembly comprises a hinge base part and a door hinge part, the hinge base part being provided in a groove formed at a joint between a roof panel and a side panel of the vehicle body, and the door hinge part being attached to the rear door and swingably supported by the hinge base part,
   wherein the hinge base part comprises an anchor portion, a swing motion support portion and a connecting portion, the anchor portion being fixed to a bottom of the groove, the swing motion support portion being disposed in a position aligned in a longitudinal direction of the vehicle with the anchor portion and separate from the anchor portion, and configured to support the door hinge part in a manner that permits the door hinge part to swing in upward and downward directions, and the connecting portion extending between the anchor portion and the swing motion support portion to fix the swing motion support portion relative to the anchor portion,
   wherein the groove is formed to extend in the longitudinal direction from a front end to a rear end of the roof panel and opened upward at an upper exterior surface of the vehicle body, the groove having a uniform width in the transverse direction of the vehicle along the whole length and being covered with a single roof molding placed on the entire opening of the groove, the hinge base part being covered with the roof molding; and
   wherein the anchor portion has a fixing hole through which a fastening is inserted and the swing motion support portion has a shaft bearing hole through which a hinge pin is inserted so that the door hinge part is swingably supported, the shaft bearing hole and the fixing hole being aligned in a longitudinal direction of the vehicle.

2. A rear part structure of a vehicle according to claim 1, wherein the anchor portion comprises a flat surface configured to be in a face-to-face contact with the bottom of the groove, the flat surface extending in a transverse direction of the vehicle within the groove.

3. A rear part structure of a vehicle according to claim 1, wherein the swing motion support portion is formed to extend in a vertical direction.

4. A rear part structure of a vehicle according to claim 1, wherein a breadth of the swing motion support portion in the transverse direction of the vehicle is smaller than a breadth of the anchor portion in the transverse direction of the vehicle.

5. A rear part structure of a vehicle according to claim 1 wherein the anchor portion, the swing motion support portion and the connecting portion are provided in a single molded piece.

6. A rear part structure of a vehicle according to claim 1, wherein the fastening is used for fixing the anchor portion of the hinge base part to the bottom of the groove, and
   wherein the roof molding provided on the groove is fixed by the fastening to the vehicle body.

7. A rear part structure of a vehicle according to claim 1, wherein the door hinge part of the hinge assembly is disposed in a position outward in the transverse direction of the vehicle relative to the swing motion support portion.

8. A rear part structure of a vehicle according to claim 1, wherein the roof molding comprises an engageable recess which is a recessed portion in which a molding mounting clip is fitted, the molding mounting clip comprising a molding fitting portion which is engaged with the engageable recess and an engageable hole which is engaged with the fastening.

9. A rear part structure of a vehicle according to claim 4, wherein a thickness of a portion of the door hinge part disposed in the axial direction adjacent to the swing motion support portion is smaller than a thickness which is obtained by subtracting a thickness of the swing motion support portion in the transverse direction of the vehicle from a breadth of the anchor portion in the transverse direction of the vehicle.

10. A rear part structure of a vehicle according to claim 6, wherein the fastening comprising
a bolt portion having a longitudinal axis,
an upper projecting portion integrally formed with the bolt portion and being coaxial therewith, and
a flange extending radially outwardly from an area of the fastening between the bolt portion and the projecting portion;
wherein the roof molding provided on the groove is fixed to the vehicle body by being operatively attached to the fastening.

11. A rear part structure of a vehicle according to claim 1, further comprising a molding mounting clip for slidably receiving said roof molding thereon,
said molding mounting clip being operatively attached to the fastening, and comprising:
a bottom plate portion having a first width in the vehicle width direction and having amounting hole formed therein configured to receive the projecting portion of the fastening therein, said bottom plate portion configured to fit into said groove, and
a molding fitting portion integrally formed with the bottom plate portion and having a second width in the vehicle width direction which is wider than the first width.

12. The rear part structure of a vehicle according to claim 1, wherein the roof molding:
has a substantially constant width from a front end to a rear end thereof,
is configured to cover substantially the entire length and width of the groove, and
is substantially C-shaped in the cross section.

13. A rear part structure of a vehicle according to claim 1, wherein the hinge base part comprises a shaft-bearing cylindrical portion located at a substantially middle position within the groove.

* * * * *